US008180339B2

(12) United States Patent
Douglas et al.

(10) Patent No.: US 8,180,339 B2
(45) Date of Patent: May 15, 2012

(54) METHOD AND APPARATUS FOR TRANSFERRING NETWORK MANAGEMENT INFORMATION TO WIRELESS NODES

(75) Inventors: Bretton Lee Douglas, San Jose, CA (US); Gregg Scott Davi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 775 days.

(21) Appl. No.: 11/502,207

(22) Filed: Aug. 9, 2006

(65) Prior Publication Data

US 2008/0037482 A1    Feb. 14, 2008

(51) Int. Cl.
*H04W 24/00* (2009.01)
(52) U.S. Cl. .......... 455/424; 455/414.4; 455/418; 455/67.11; 455/423; 340/539.13; 340/539.11
(58) Field of Classification Search .......... 455/410, 455/67.11, 422.1–425, 414.3, 418; 370/245, 370/338; 340/539.13, 539.11
See application file for complete search history.

(56) References Cited

U.S. PATENT DOCUMENTS

| 6,216,007 | B1 * | 4/2001 | Havinis et al. | 455/456.2 |
| 6,416,471 | B1 * | 7/2002 | Kumar et al. | 600/300 |
| 6,445,917 | B1 * | 9/2002 | Bark et al. | 455/423 |
| 2005/0282540 | A1 * | 12/2005 | Motamedi et al. | 455/423 |
| 2008/0278313 | A1 * | 11/2008 | Theimer et al. | 340/539.13 |

OTHER PUBLICATIONS

Blandford, Jameson, and Daniel Renfroe, "Review: Wireless LAN Analysis Tools,", Dec. 8, 2005.

* cited by examiner

*Primary Examiner* — Nick Corsaro
*Assistant Examiner* — Quan Hua
(74) *Attorney, Agent, or Firm* — Baker Botts L.L.P.

(57) ABSTRACT

Methods, apparatuses and systems directed to providing network management information to wireless access points in a wireless network. In one implementation, a wireless client interrogates a wireless access point for its MAC address, for service set identifier (SSID) information, and/or for authentication-related information. If the wireless client determines that the wireless access point is the correct wireless access point, the wireless client polls sensors for physical environment and parameter (PEP) data, which the wireless client then transmits to the wireless access point.

29 Claims, 8 Drawing Sheets

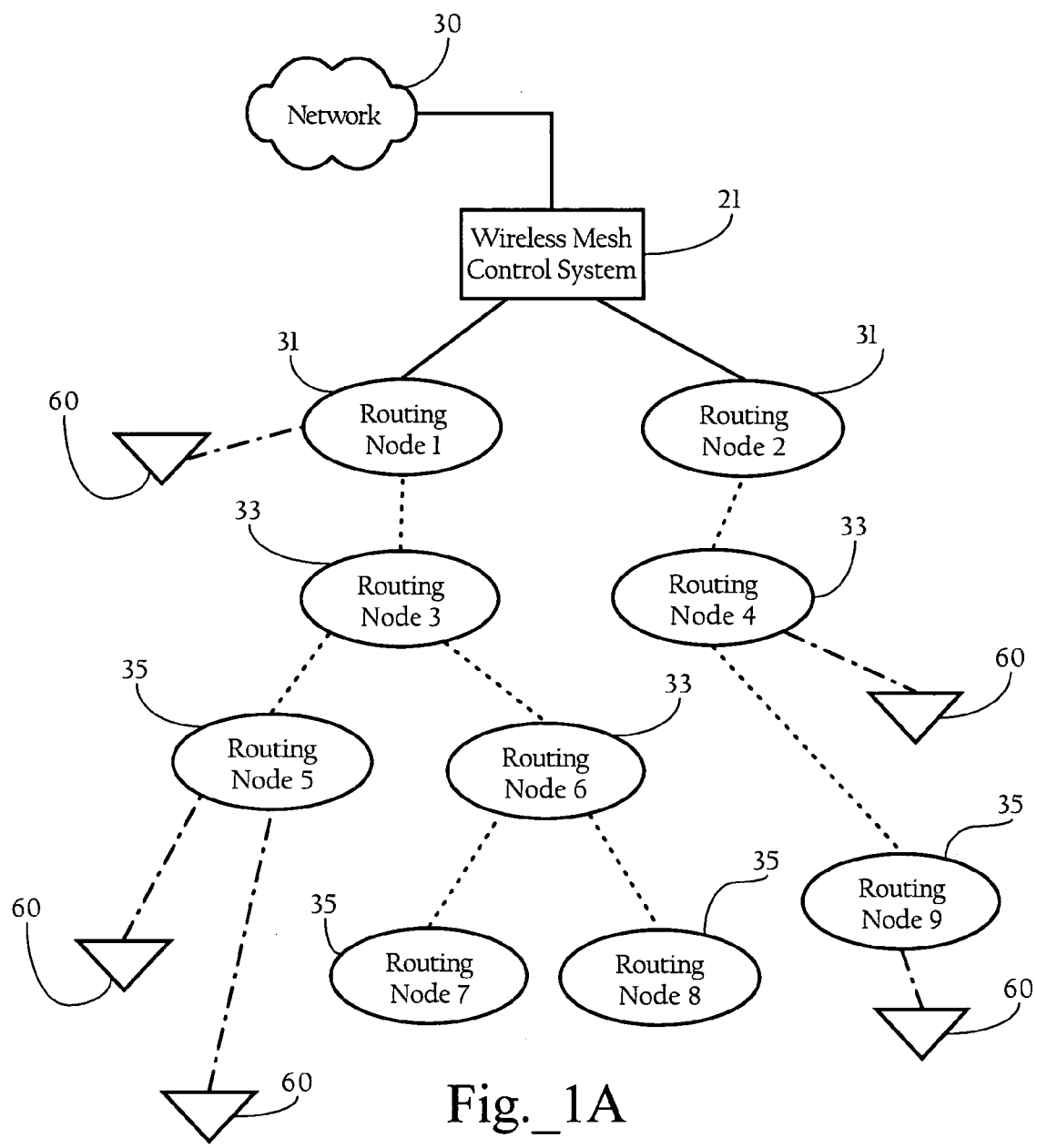
Fig._1A

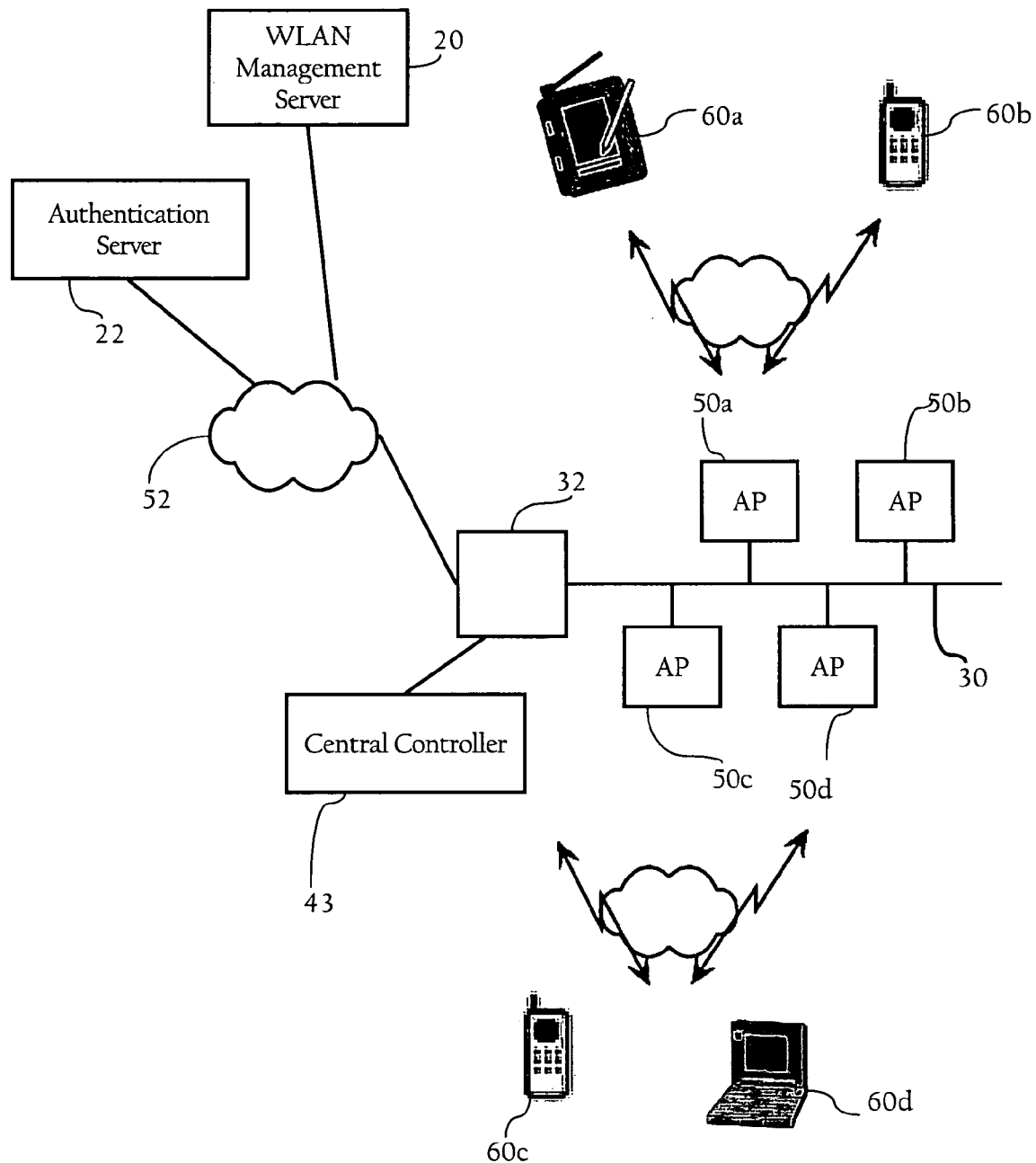
Fig._1B

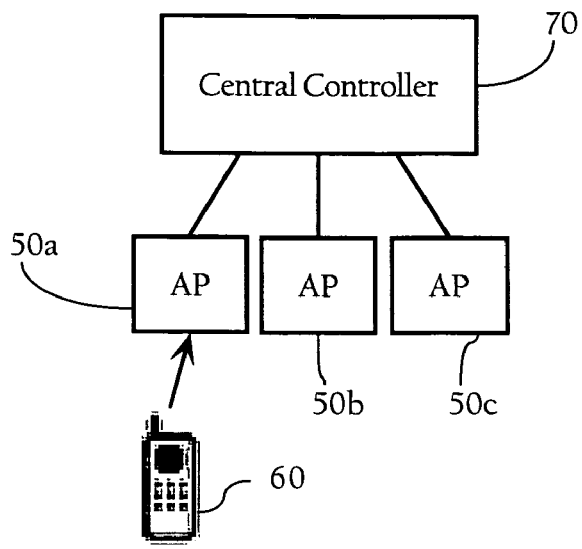
Fig. _1C
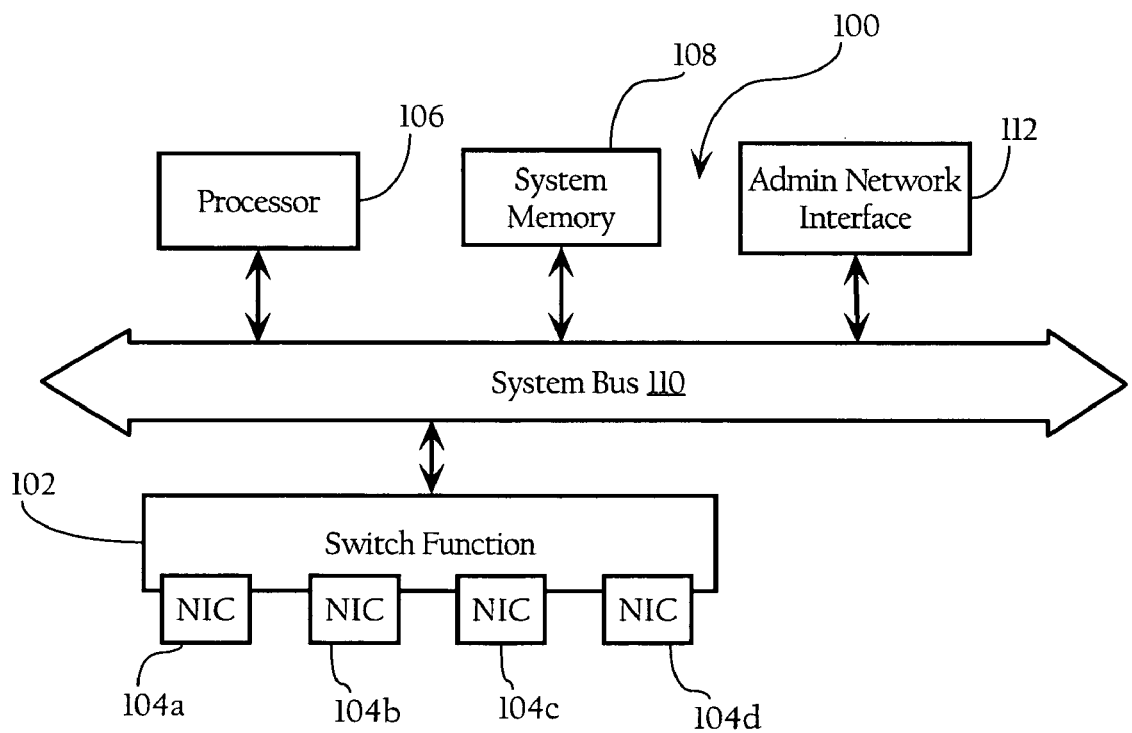
Fig. _1D

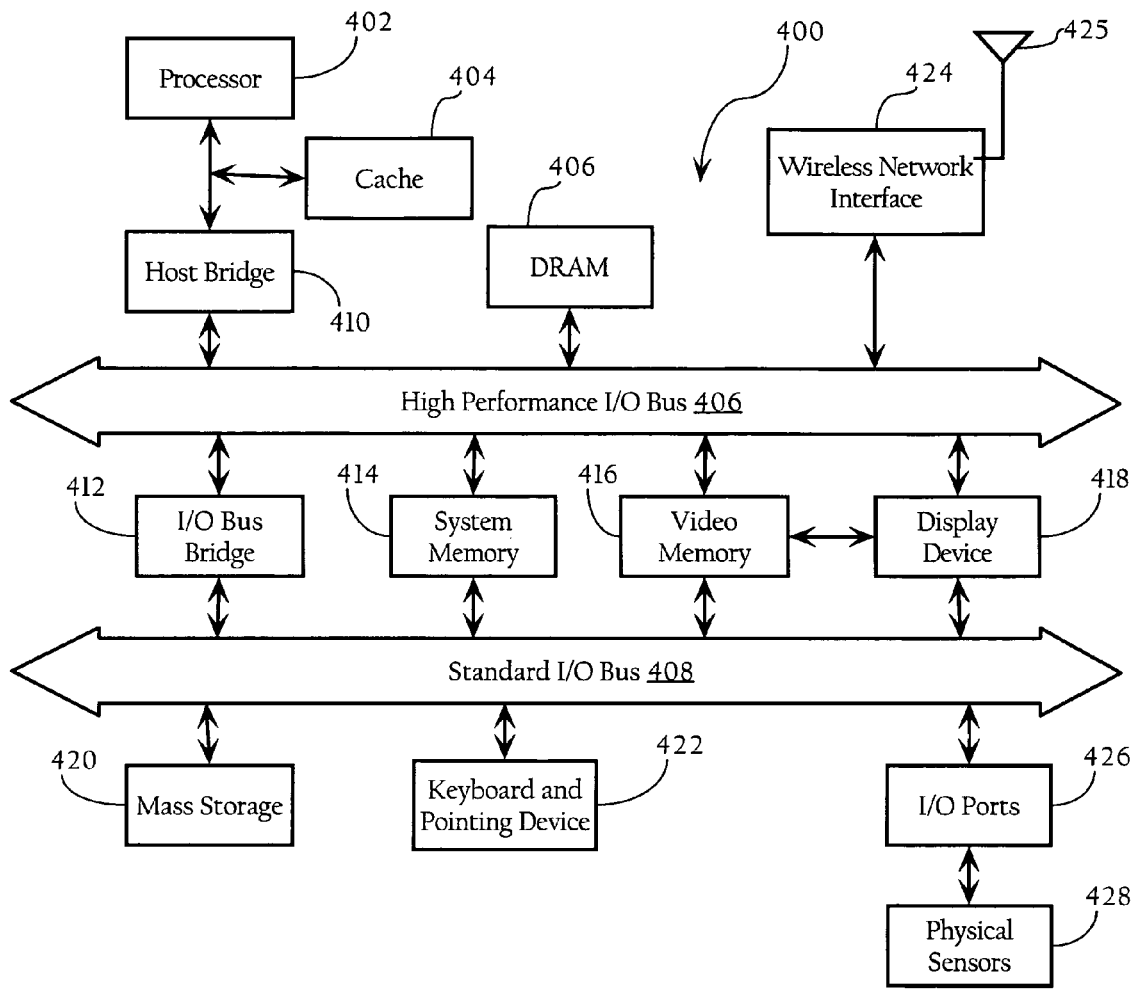
Fig._3

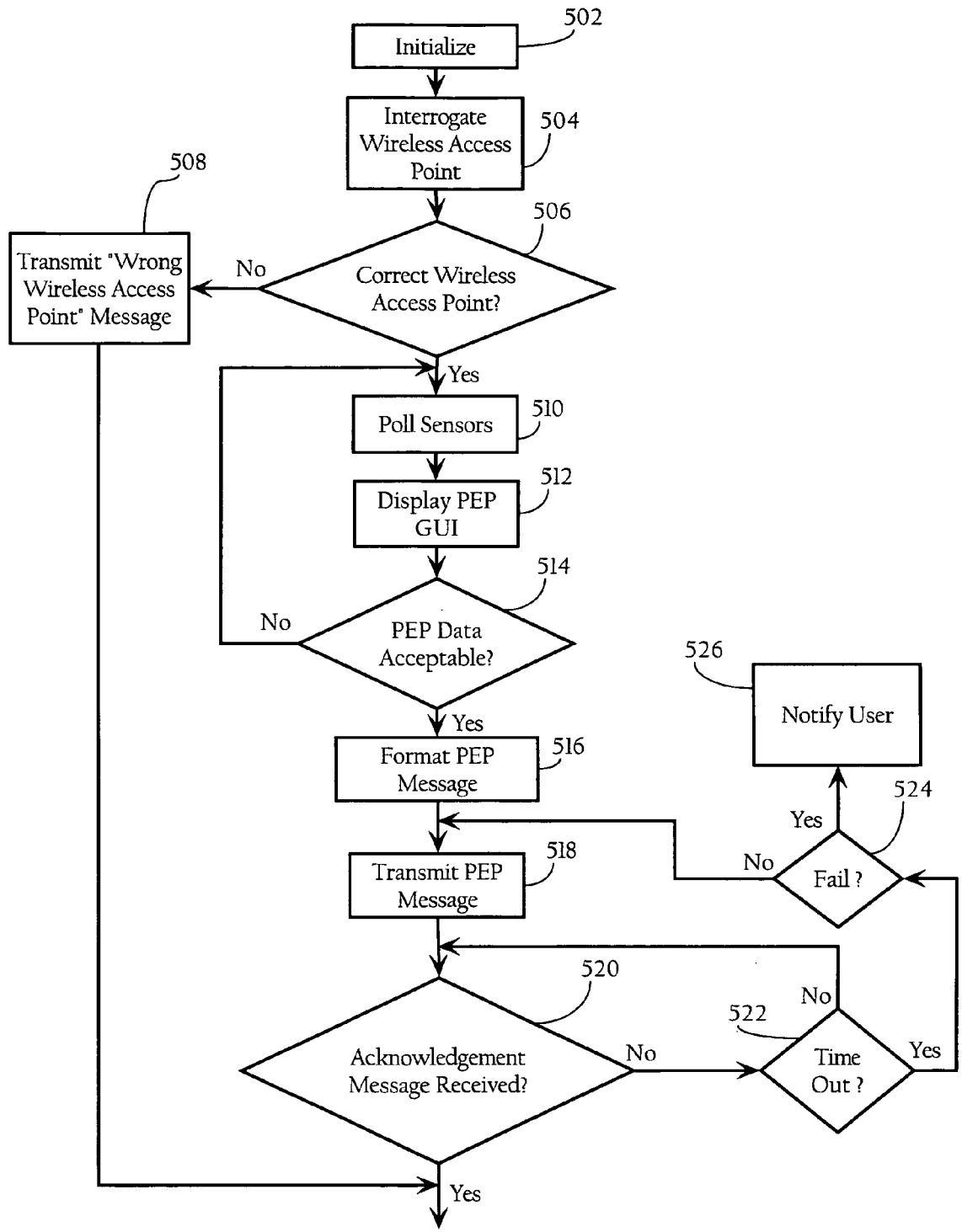
Fig._4

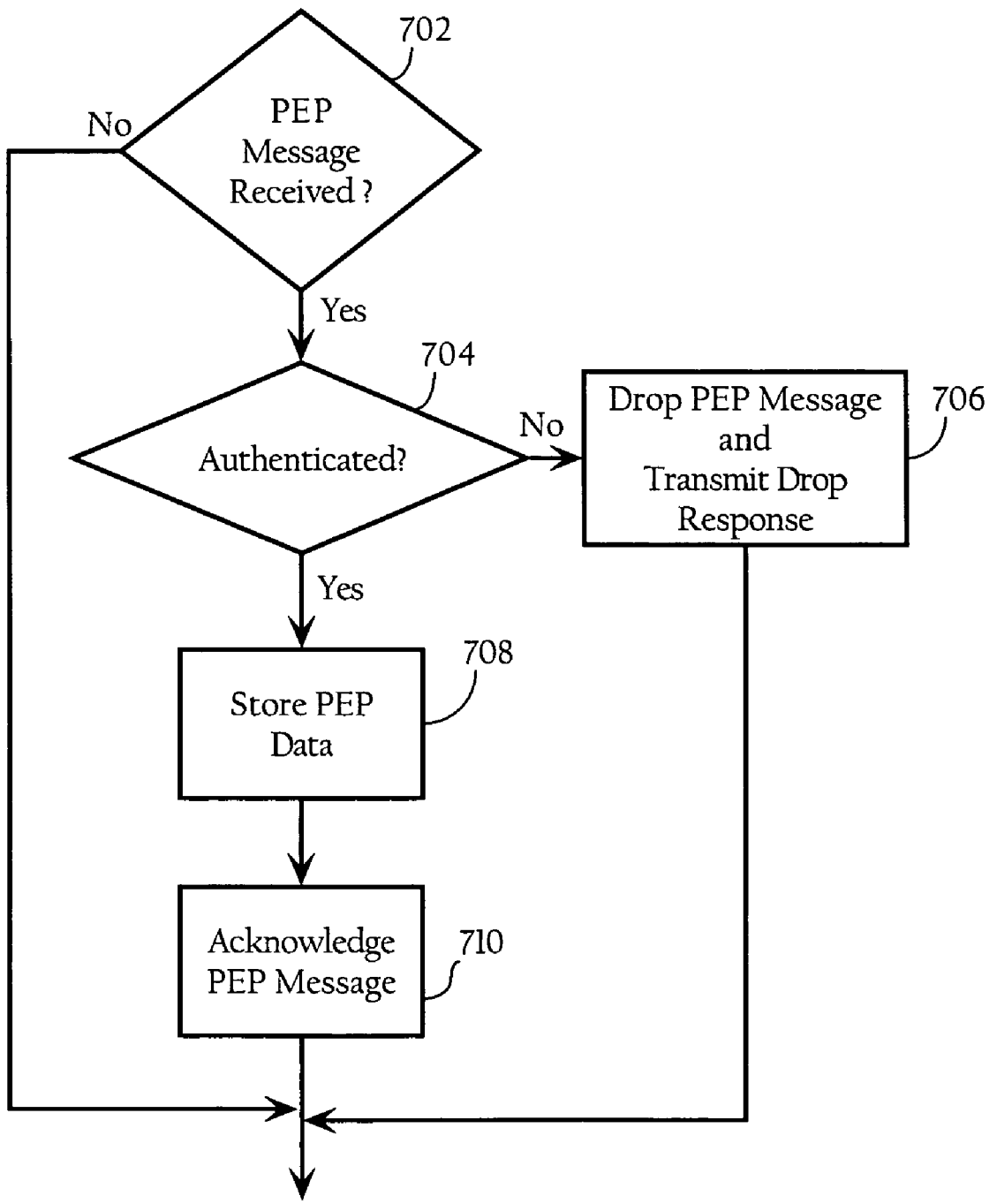
Fig._6

US 8,180,339 B2

METHOD AND APPARATUS FOR TRANSFERRING NETWORK MANAGEMENT INFORMATION TO WIRELESS NODES

FIELD OF THE INVENTION

The present invention relates to wireless networks and, more particularly, to methods, apparatuses, and systems directed to capturing wireless network management information corresponding to elements of a wireless network.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

When managing a wireless network, it is useful to have as much information as possible about each wireless network element, such as access points and wireless routing nodes. Such information may include, for example, location, elevation, power source, antenna type, antenna orientation, etc. One problem with procuring such information is that it is expensive to equip each wireless access point with the sensors and other functionality necessary to capture the information. Accordingly, a network administrator typically conducts a site survey manually to assess the physical location of the wireless elements, radio coverage and other performance attributes of the wireless elements. After desired network management information is collected, the administrator must then enter this information into a wireless network management system. This of course can be very time consuming and often error-prone.

DESCRIPTION OF THE DRAWINGS

FIG. 1A is a topological diagram of a hierarchical wireless mesh network according to one implementation of the present invention.

FIG. 1B is a topological diagram of the components in a wireless local area network (WLAN) system according to one implementation of the present invention.

FIG. 1C illustrates a hierarchical wireless network including a central controller according to one implementation of the present invention.

FIG. 1D illustrates for didactic purposes a hardware system, which may be used to implement a central controller.

FIG. 3 illustrates for didactic purposes a hardware system, which may be used to implement a wireless client.

FIG. 4 is a flow chart illustrating a process flow, according to one implementation of the present invention, implemented by a wireless network management capture application.

FIG. 6 is a flow chart illustrating a process flow, according to one implementation of the present invention, implemented at a wireless access point.

DESCRIPTION OF EXEMPLARY EMBODIMENTS

A. Overview

Figure 2A:
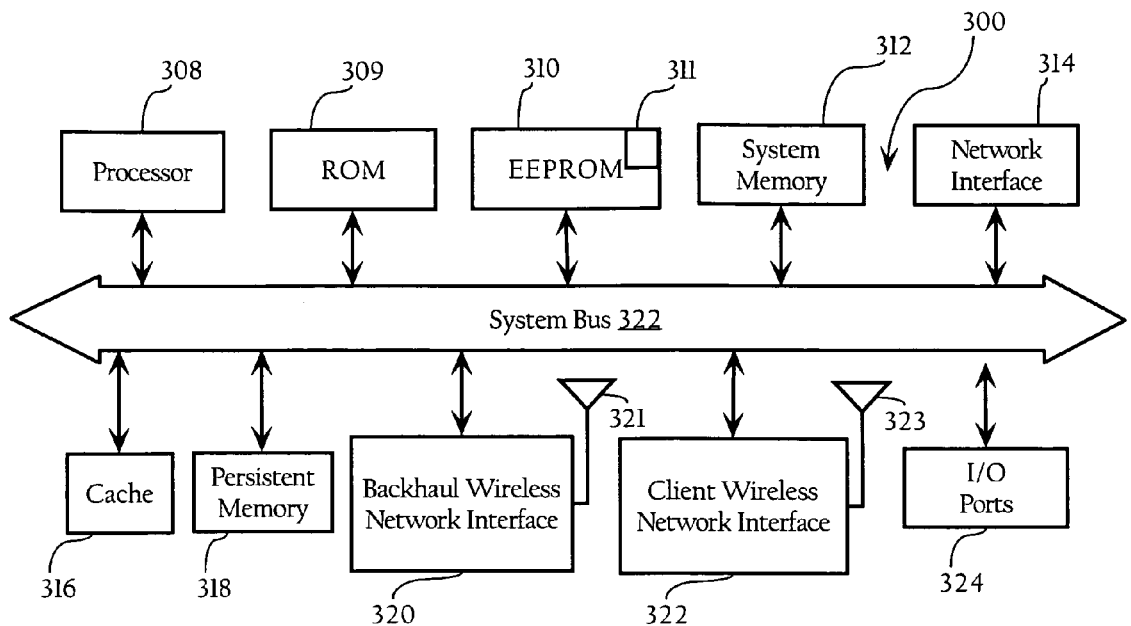
FIG. 2A illustrates for didactic purposes a hardware system, which may be used to implement a wireless access point in a wireless mesh network.

The present invention provides methods, apparatuses, and systems directed to capturing wireless network management information for elements of a wireless network, such as wireless access points. In one implementation, a portable wireless client (e.g., a laptop, a handheld device), equipped with one or more sensors and a wireless network management capture application, interrogates a selected element of a wireless network for its MAC address, for service set identifier (SSID) information, and/or for identification- or authentication-related information. The wireless client polls one or more sensors for physical environment and parameter (PEP) data, which may include: antenna orientation, GPS position, altitude, height above the ground, height above/below clutter, pointing directions of antennas. Other PEP-related data, such as power source, type and capacity of backup power, number of antennas, antenna types, and unique identifiers for the network nodes, may be manually entered into the wireless client. The wireless network management capture application may also present a graphical user interface, which displays the polled PEP data and empty fields associated with the PEP data to enable a user to modify the PEP data or enter additional PEP data or other network management information using a keyboard or other input device. After the user accepts the PEP data, the wireless network management capture application generates and formats a PEP message that includes the PEP data and transmits the PEP message to the wireless network element.

In one implementation, the wireless network element receives the PEP message including PEP data from the wireless network management capture application. In one implementation, the wireless network element authenticates the PEP message and stores the PEP data in a memory location. In one implementation, the memory location is a reserved memory space in a read-only memory (ROM), or alternatively, in an electronically erasable programmable read-only memory (EEPROM). In one implementation, the wireless access point acknowledges the PEP message. The PEP data is then accessible to one or more remote systems, such as a wireless network management application, which can query the wireless network element for the PEP data.

B. Exemplary Wireless Network System Architecture

B.1. Network Topology

For didactic purposes, an embodiment of the present invention is described as operating in an outdoor hierarchical wireless mesh network including a plurality of wireless mesh access points. The present invention, however, can operate in a wide variety of mesh network configurations. FIG. 1A illustrates a wireless mesh network according to an implementation of the present invention. In one implementation, the wireless mesh network includes a wireless mesh control system 21, and a plurality of routing nodes. In one implementation, a hierarchical architectural overlay is imposed on the mesh network of routing nodes to create a downstream direction towards leaf routing nodes 35, and an upstream direction toward the root routing nodes 31. For example, in the hierarchical mesh network illustrated in FIG. 1, first hop routing node 1 31 is the parent of intermediary routing node 3 33. In addition, intermediate routing node 3 33 is the parent to leaf routing node 5 35, and intermediate routing node 6 32. In one implementation, this hierarchical relationship is used in routing packets between wireless clients 60, or between wireless clients 60 and network 30. In the wireless mesh network illustrated in FIG. 1A, the routing nodes are arranged in two hierarchical tree structures—one root node is routing node 1, while the other root node is routing node 2. Of course, a variety of wireless mesh network configurations are possible, including non-hierarchical configurations, and hierarchical configurations with fewer or greater number of hierarchical tree structures.

The routing nodes in the mesh network, in one implementation, generally include one radio, operating in a first frequency band, and associated wireless communication functionality to communicate with other routing nodes to thereby implement the wireless backbone, as discussed more fully below. All or a subset of the routing nodes, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each wireless node may interact with wireless clients on the 2.4 GHz band (802.11b/g). Of course, this relation can also be reversed with backhaul traffic using the 802.11b/g frequency band, and client traffic using the 802.11a band. In addition, the mesh routing nodes may include only a single radio or additional radios.

The present invention can also be applied in other network topologies and environments. For example, a network environment including a wireless local area network (WLAN) according to one implementation of the present invention is shown in FIG. 1B. In a specific embodiment of the present invention, the system includes, a WLAN management server 20, an Authentication Authorization and Account (AAA) server 22, and a central controller 43), a local area network (LAN) 30, a router 32, and wireless access points 50a, 50b, 50c, and 50d (collectively referred to as wireless access points 50). LAN 30 is implemented by a switch (or an array of switches) and/or other network devices, such as a bridge. Embodiments of the present invention may apply to outdoor mesh networks, IEEE 802.16 and cellular base stations, as well as indoor wireless LAN networks.

As FIG. 1B illustrates, in one implementation, the network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1B illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (FIG. 1B). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points. As described in more detail below, the network infrastructure may also include wireless nodes in a mesh network.

B.2. Central Controller

FIG. 1C illustrates a hierarchical wireless network including a central controller 70, according to one implementation of the present invention. In one implementation, the central controller 70 may be implemented as a wireless domain server (WDS) or, alternatively, as a wireless switch. If the central controller 70 is implemented with a WDS, the central controller 70 is operative to communicate with autonomous or so-called "fat" wireless access points. If the central controller 70 is implemented as a wireless switch, the central controller 70 is operative to communicate with light-weight wireless access points and process wireless protocol and network management information. As FIG. 1B illustrates, a central controller 70 may be directly connected to one or more access points 50. Alternatively, a central controller 43 may be operably connected to one or more access points over a switched and/or routed network environment, as FIG. 1A illustrates.

FIG. 1D illustrates for didactic purposes a hardware system 100, which may be used to implement a central controller 70 of FIG. 1B. As FIG. 1C shows, in one implementation, the central control elements each comprise a switch function or fabric 102 comprising a network interface 104a (e.g., a Ethernet adapter) for connection to network 52 and network interfaces 104b, 104c, and 104d for connection to wireless access points. This switch function or fabric is implemented to facilitate connection to the access elements. Central controller 70, in one implementation, further comprises a processor 106, a memory 108, one or more software modules, stored in memory 108, including instructions for performing the functions described herein, and a system bus 110 operably connecting these components. The central control elements may optionally include an administrative network interface 112 allowing for administrative access for such purposes as configuration and diagnostic access. In other implementations, central controller 70 includes a single network interface.

B.3. Wireless Access Point

FIG. 2A illustrates for didactic purposes a hardware system 300, which may be used to implement a wireless access point 50 in a wireless mesh network. In one implementation, the wireless access point 300 comprises a processor 308, a read-only memory (ROM) 309, and an electronically erasable read-only memory (EEPROM) 311 including reserved memory space 311 for storing network management information including physical environment and parameter (PEP) information. As described in more detail below, the PEP data may include, for example, antenna orientation, global positioning system (GPS) position, altitude, and height above the ground, etc. The wireless access point 300 may also include one or more of the following: a memory 312, a network interface 314 (e.g., an 802.3 interface) for communication with a LAN, a cache 316 for storing WLAN information, and a persistent memory 318. The wireless access point 300 may also include a backhaul wireless network interface 320 having an antenna 321. Backhaul wireless network interface 320 is configured to transmit and receive messages to/from one or more other wireless access point in a mesh network. The wireless access point 300 may also include a client wireless network interface 322 (e.g., an IEEE 802.11 WLAN interface) having an antenna 323. Client wireless network interface 322 is configured for wireless communication with one or more wireless clients 60. The wireless access point 300 may also include and a system bus 322 interconnecting these components, input/output (I/O) ports 324, and an optional administration or control port (326).

In operation, client wireless network interface 322 captures network management information from a wireless client (e.g., a laptop) for storage in EEPROM 311, and backhaul wireless network interface 320 transmits the EEPROM information to the wireless network management system. In some implementations, wireless access point 50 use one or more of the following standards: WiFi/802.11, WiMax/802.16, 2G, 3G, or 4G Wireless, Bluetooth/802.15, Zigbee, or any other suitable wireless communication standards. In one implementation, wireless access point 50 may have a separate access radio, and associated interface components, for communicating with a wireless client or other portable computer. The wireless access points 50 may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310. In one implementation, the wireless access point includes software or firmware modules for recognizing the reception of network management information (e.g., PEP data) and for storing such information in memory (e.g., EEPROM 310).

Figure 2B:
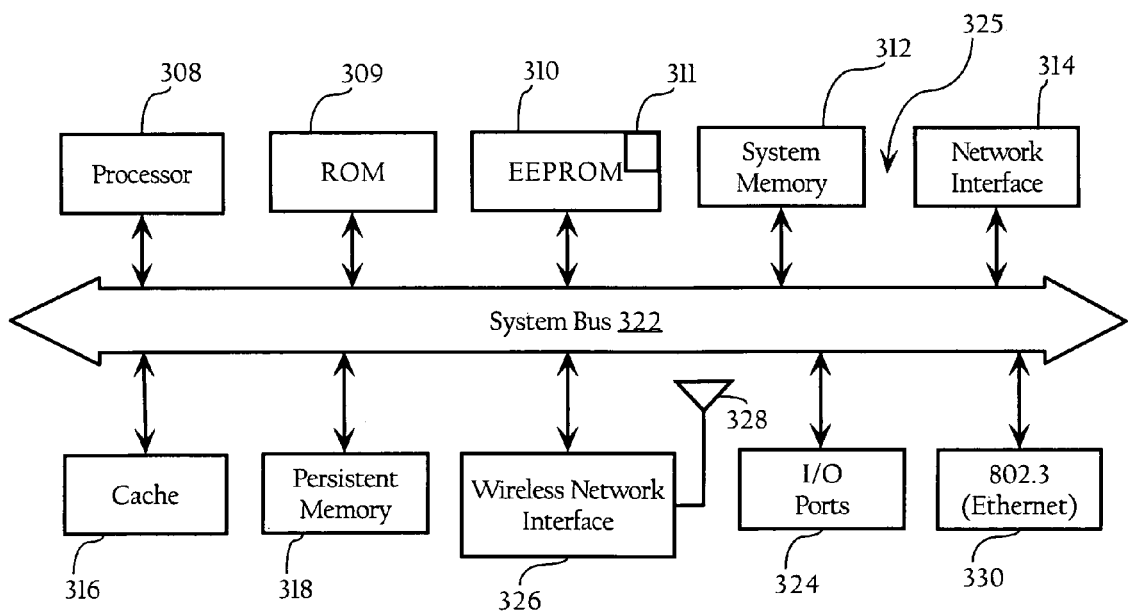
FIG. 2B illustrates for didactic purposes a hardware system, which may be used to implement a wireless access point in a wireless LAN network.

FIG. 2B illustrates for didactic purposes a hardware system 325, which may be used to implement a wireless access point in a wireless LAN network, in accordance with another implementation. In one implementation, the wireless access point 325 may have similar components to that of wireless access point 300 of FIG. 2A except that wireless access point 325 of FIG. 2B includes wireless network interface 326 and antenna 328 instead of backhaul wireless network interface 320, antenna 321, client wireless network interface 322, and antenna 323. Furthermore, wireless access point 325 also includes an 802.3 (Ethernet) interface 330.

B.4. Wireless Client

FIG. 3 illustrates for didactic purposes a hardware system 400, which may be used to implement a wireless client 60. In one embodiment, hardware system 400 includes a processor 402 and a cache memory 404 coupled to each other as shown. Additionally, hardware system 400 includes a dynamic random-access memory (DRAM) 406, a high performance input/output (I/O) bus 406 and a standard I/O bus 408. A host bridge 410 couples processor 402 to high performance I/O bus 406, whereas an I/O bus bridge 412 couples the two buses 406 and 408 to each other. A wireless network interface 424 having an antenna 425, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a wireless mesh network 802.16, WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400. In some implementations, I/O ports 426 may also be universal serial bus (USB) ports, PCI ports, or PCMCIA ports. In one implementation, I/O ports 426 couple to physical sensors 428 operative to sense and/or collect PEP or PEP-related data. In one implementation, physical sensors 428 may include one or more of an altimeter, a compass, a global positioning system (GPS) receiver, and/or a laser range-finder for measuring height. In one implementation, wireless client 60 includes a radio for communicating with wireless access points and also includes controllable power so that the power can be reduced (and the data rate increased) to a point where wireless access point 60 may communicate with a single nearby wireless access point.

In one implementation, wireless client 60 may be a laptop, portable, or other suitable handheld computer with the appropriate sensors and a wireless communication path to capture the PEP data and transfer the PEP data to a wireless node such as a wireless access point.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless network management capture functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the wireless network management capture functionality can be implemented in hardware or firmware.

While FIG. 3 illustrates, for didactic purposes, the hardware architecture of a wireless client according to one implementation of the present invention, the wireless client, however, may be implemented on a wide variety of computer system architectures, such as special purpose, hand held or portable devices, Personal Digital Assistants (e.g., converged devices which support WLAN data+voice), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Collection of Network Management Information

The following describes how a wireless network management capture application collects network management information (including PEP data), how a user may modify the collected network management information, and how a wireless access point receives and processes the network management information.

FIG. 4 is a flow chart illustrating a process flow, according to one implementation of the present invention, implemented at a wireless client 60. As FIG. 4 shows, wireless client 60 initializes (502) and then interrogates wireless access point 50 (504). In one implementation, the wireless client 60 may query wireless access point 50 for its MAC address, for service set identifier (SSID) information, and/or for authentication-related information. In one implementation, wireless network management capture application displays the MAC address and SSID of the wireless access point to allow the user to determine whether the wireless client 60 has associated with the desired wireless network element. In another implementation, if wireless network management capture application is configured with such identifying information, it can perform this determination automatically. In yet another implementation, wireless network management application can present a list of wireless access points detected during a scanning period and allow a user to select a desired wireless access point. In this case, the application would select the wireless access point with the strongest RSSI to make sure it associates to the wireless access point in close proximity.

In one implementation, if the wireless client 60 has associated with an incorrect or undesired wireless access point 50 (506), it terminates the connection, transmitting a "wrong wireless element" message (508). Otherwise, wireless client 60 polls one or more sensors for PEP data (510). In one implementation, the PEP data may include: antenna orientation, GPS position, altitude, height above the ground, height above/below clutter, pointing directions of antennas. Other PEP-related data, such as power source, type and capacity of backup power, number of antennas, antenna types, and unique identifiers for the network nodes, may be manually entered into the wireless client. Next, wireless client 60 displays a graphic user interface (GUI) (612). As described in more detail below in connection with FIG. 5, in one implementation, the GUI displays the collected PEP data. In one implementation, the GUI also displays empty fields associated with the PEP data to enable a user to modify the PEP data or enter additional network management information using the keyboard or other input device. Next, if the user determines that the PEP data is unacceptable 514 (or otherwise desires to refresh the PEP data), the user may cause the wireless network management capture application to re-poll the sensors (510). After the user has inspected the collected PEP data (optionally modifying it and/or manually entering additional data), the user may invoke an interface control that causes the wireless network management capture application to generate a PEP message (516), which includes the PEP data. In one implementation, the PEP message may also include a unique identifier—e.g., a MAC address, or other identifier—that would enable the wireless access point to determine whether the PEP data contained in the PEP message is vital network management information. An associated wireless client will transmit many 802.11 frames to the Mesh AP to which the wireless client is associated. The PEP information frames may be much rare. In one implementation, the wireless client transmits a unique frame format for the PEP information frames to ensure that the Mesh AP/Base station/AP can recognize it and store the information in EEPROM. In one implementation, wireless client 60 applies one or more security policies to the PEP message (e.g., encrypting and/or digitally signing the PEP message to prevent malicious tampering or requiring an encryption key or other secret for access to the PEP message). Next, wireless client 60 transmits the PEP message to the wireless access point (518). If wireless client 60 receives an acknowledgement message (520), the process ends; however, if an acknowledgment is not received after a time out counter expires (522), wireless client re-transmits the PEP message (518). However, if the number of re-try attempts exceeds a threshold (524), wireless network management capture application notifies the user (526), in one implementation, displaying a failure n alert dialog box.

Figure 5:
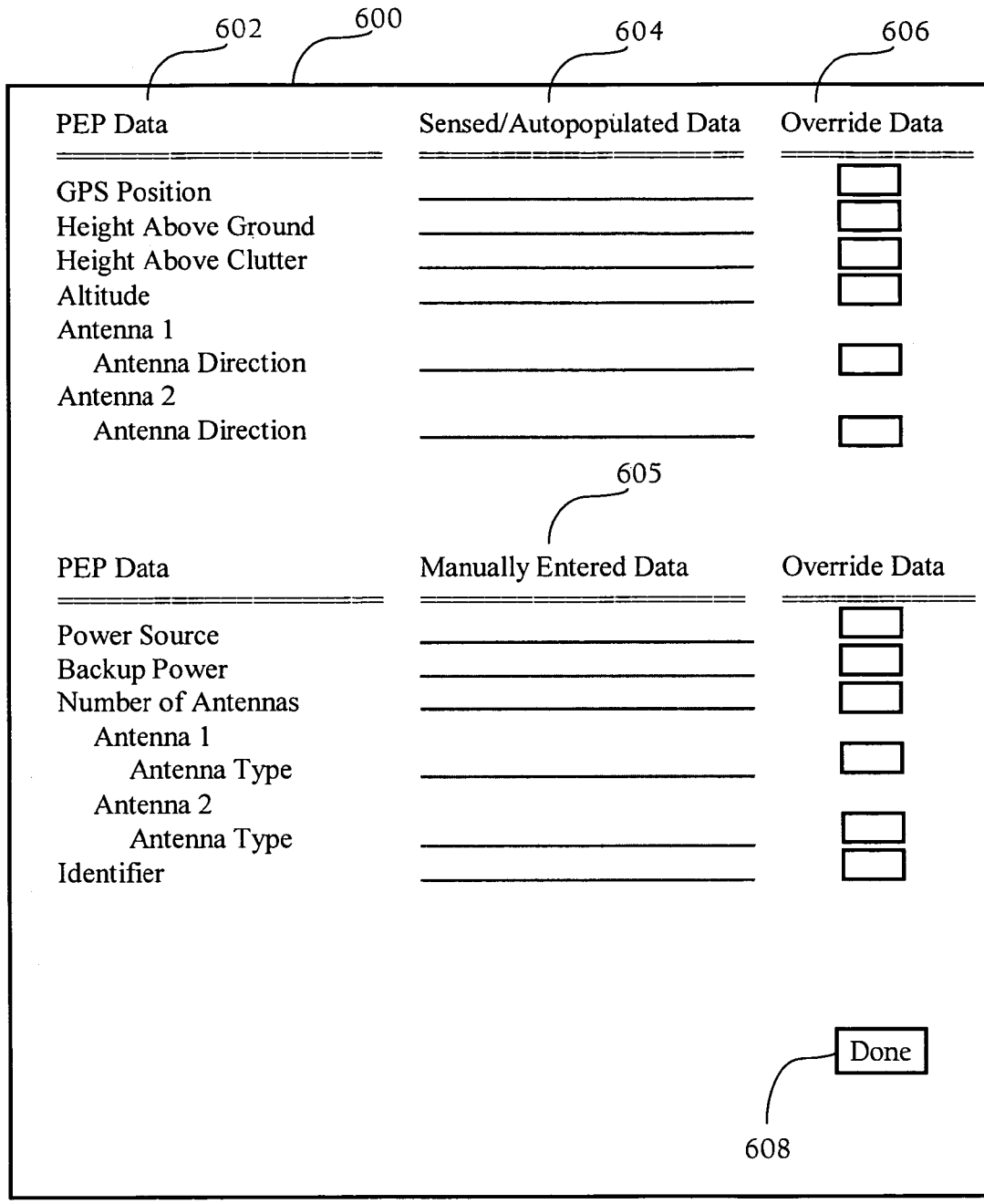
FIG. 5 is a diagram illustrating a simplified screen shot showing physical environment and parameter (PEP) data, according to one implementation of the present invention, presented by a wireless network management capture application.

FIG. 5 is a diagram illustrating a simplified screen shot displaying PEP data, according to one implementation of the present invention, implemented at a wireless client 60. As FIG. 5 shows, a display screen 600 displays a PEP data type column 602, a sensed/autopopulated data column 604, a manually entered data column 605, and an override data column 606. In one implementation, the PEP data type column 602 may include information such as GPS position, height above ground, height above or below clutter, altitude, power source (e.g., AC voltage, DC voltage, etc.), backup power source (type and capacity), pointing direction of antennas, antenna type, unique identifiers or miscellaneous information (e.g., street address), etc. As described above, a user (e.g., a network administrator or installer) may use empty fields in the override data column 606 to either modify the polled PEP data displayed in sensed/autopopulated data column 604 and manually entered data column 605, or to enter any missing PEP data or any other network management information.

As described above, it is expensive to equip each wireless access point with all of the instrumentation necessary for each wireless access point to capture network management information. Equipping a single portable computer with the necessary network management information is more cost-effective. Furthermore, wireless transfer of network management information may be more cost effective than wired transfer of that information, because wireless communication requires no new physical interfaces. While a wireless connection is preferred because it may be more cost effective, a physical console port with a wired connection may also be used to transfer network management information.

FIG. 6 is a flow chart illustrating a process flow, according to one implementation of the present invention, implemented at a wireless access point 50. In one implementation, wireless access point 50, after deployment and initialization may operate in an access point mode providing wireless network service to one or more wireless clients. While in this mode or other modes, a wireless network management capture application may interrogate the wireless client and transmit a PEP message to the wireless access point 50. As FIG. 6 illustrates, wireless access point 50 determines whether it has received a PEP message (702). If so, wireless access point 50 determines if the PEP message is authentic (704) (e.g., by using encryption keys, passwords, or any suitable authentication methods. If the PEP message is not authentic, wireless access point 50 drops the PEP message and transmits a drop response (706). If the PEP message is authentic, wireless access point 50 stores PEP data from the PEP message (708) in a memory location (e.g., reserved memory space 311 in the EEPROM 310). In some implementations, wireless access point 50 may re-read the PEP data from the non-volatile memory and echo it back to wireless client 60. Finally, wireless access point 50 acknowledges the PEP message in a step (710). In one implementation, the PEP data is not stored in memory but is accessible to WLAN management server 20.

In one implementation, WLAN management server 20 may query the mesh nodes/base stations (i.e., wireless access points) for the PEP information stored in their EEPROMS. In one implementation, WLAN management server 20 may then display the PEP information for an operator. In one implementation, WLAN management server 20 may use any suitable request-response protocol to get the PEP information stored in extended MIB accessible via SNMP queries, and the like.

The present invention has been explained with reference to specific embodiments. For example, while embodiments of the present invention have been described as operating in connection with IEEE 802.11 networks, the present invention can be used in connection with any suitable wireless network environment. In addition, while the embodiments discussed above involve a wireless access points, the present invention can be used in connection with other types of wireless network equipment, such as wireless mesh routing nodes, wireless bridges, base stations, and the like. Other embodiments will be evident to those of ordinary skill in the art. It is therefore not intended that the present invention be limited, except as indicated by the appended claims.

What is claimed is:

1. A non-transitory storage media comprising instructions for execution by one or more processors and when executed operable to cause the one or more processors to:
   detect, by scanning using a communications interface of a wireless client host, one or more remote wireless elements of a wireless network in physical radio frequency vicinity of the client host;
   select, using the communications interface of the wireless client host, a detected remote element of the one or more remote elements of the wireless network detected during the scan using a network identifier of the selected wireless remote element;
   interrogate the selected remote wireless element, using one or more sensors directly attached to the wireless client host by:
      sensing signal characteristics of a radio frequency signal received from the selected wireless remote element;
      analyzing the sensed signal characteristics associated with the selected wireless remote element; and
      determining installation configuration information of the selected wireless remote element; and
   transmit to the selected wireless remote element, using the communications interface of the wireless client host, a message including the installation configuration information corresponding to the selected wireless remote element, wherein said transmitting includes identifying the selected wireless remote element using the network identifier and inserting in the message a network command that upon execution causes the selected wireless remote element to locally store the installation configuration information in a file maintained in a non-volatile memory of the selected wireless remote element for later retrieval.

2. The instructions of claim 1 wherein the instructions is further operable to enable an operator to provide manual input or override the physical environment information.

3. The instructions of claim 1 wherein at least one of the sensors is a global positioning system receiver.

4. The instructions of claim 1 wherein at least one of the sensors is one of a laser rangefinder for height above ground, an altimeter for altitude, and a compass for antenna pointing direction.

5. The instructions of claim 1 wherein the instructions is further operable to display polled physical environment information.

6. The instructions of claim 5 wherein the instructions is further operable to:
   display fields for the polled physical environment information; and
   enable a user to modify the polled physical environment information.

7. The instructions of claim 5 wherein the instructions is further operable to display a graphic user interface for displaying polled physical environment information.

8. The instructions of claim 1 wherein the instructions is further operable to query the selected remote element for data.

9. The instructions of claim 1 wherein the instructions is further operable to apply one or more security policies.

10. The instructions of claim 1 wherein the message is cryptographically secured.

11. A wireless apparatus for capturing wireless network management information, comprising
   one or more sensors;
   one or more wireless network interfaces;
   a memory;
   one or more processors, the one or more processors configured to:
   detect, by scanning using the one or more wireless network interfaces, one or more remote wireless elements of a wireless network in physical radio frequency vicinity of the wireless network interfaces,
   select, using the one or more wireless network interfaces, a detected remote element of the one or more remote elements of a wireless network detected during the scan using a network identifier of the selected wireless remote element;

interrogate the selected wireless remote wireless element, using the one or more sensors to:

sense signal characteristics of a radio frequency signal received from the selected wireless remote element;

analyze the sensed signal characteristics associated with the selected wireless remote element; and determine installation configuration information of the selected wireless remote element based on the analyzed signal characteristics; and transmit to the selected wireless remote element, using the one or more wireless network interfaces, a message including the installation configuration information corresponding to the selected remote element, wherein said transmitting includes identifying the selected wireless remote element using the network identifier and inserting in the message a network command that upon execution causes the selected wireless remote element to locally store the installation configuration information in a file maintained in a non-volatile memory of the selected wireless remote element for later retrieval.

12. The apparatus of claim 11 wherein the one or more processors are further configured to enable an operator to provide manual input or override the physical environment information.

13. The apparatus of claim 11 wherein at least one of the sensors is a global positioning system receiver.

14. The apparatus of claim 11 wherein at least one of the sensors is one of a laser rangefinder for height above ground, an altimeter for altitude, and a compass for antenna pointing direction.

15. The apparatus of claim 11 wherein the one or more processors are further configured to cause the one or more processors to display polled physical environment information.

16. The apparatus of claim 15 wherein the one or more processors are further configured to cause the one or more processors to:

display fields for the polled physical environment information; and enable a user to modify the polled physical environment information.

17. The apparatus of claim 15 wherein the one or more processors are further configured to cause the one or more processors to display a graphic user interface for displaying polled physical environment information.

18. The apparatus of claim 11 wherein the one or more processors are configured to query the selected remote element for data.

19. The apparatus of claim 11 wherein the one or more processors are configured to apply one or more security policies.

20. The apparatus of claim 11 wherein the message is cryptographically secured.

21. A method for capturing wireless network management information, comprising:

detecting, by scanning using a communications interface of a wireless client host, one or more wireless remote elements of a wireless network in physical radio frequency vicinity of the wireless client host;

selecting, using the communications interface of the wireless client host, a detected wireless remote element of the one or more wireless remote elements of a wireless network detected during the scan using a network identifier of the selected wireless remote element;

interrogating the selected remote wireless element, using one or more sensors directly attached to the wireless client host by:

sensing signal characteristics of a radio frequency signal received from the selected wireless remote element;

analyzing the sensed signal characteristics associated with the selected wireless remote element; and determining installation configuration information of the selected wireless remote element; and transmitting to the selected wireless remote element, using the communications interface of the wireless client host, a message containing the installation configuration information corresponding to the selected wireless remote element, wherein said transmitting includes identifying the selected wireless remote element using the network identifier and inserting in the message a network command that upon execution causes the selected remote element to locally store the installation configuration information in a file maintained in a non-volatile memory of the selected wireless remote element for later retrieval.

22. The method of claim 21 further comprising enabling an operator to provide manual input or override the physical environment information.

23. The method of claim 21 further comprising displaying polled physical environment information.

24. The method of claim 23 further comprising:

displaying fields for the polled physical environment information; and enabling a user to modify the polled physical environment information.

25. The method of claim 23 further comprising displaying a graphic user interface for displaying polled physical environment information.

26. The method of claim 21 further comprising querying the selected remote element for data.

27. The method of claim 21 further comprising applying one or more security policies.

28. The method of claim 21 wherein the message is cryptographically secured.

29. A system comprising:

a sensor device comprising one or more sensors and a wireless communications interface, the sensor device configured to:

perform a scan, using the wireless communications interface, and detect one or more wireless access points in physical radio frequency vicinity of the sensor device, select a detected wireless access point of the one or more wireless access points detected during the scan using a network identifier of the selected wireless access point, interrogate the selected wireless access point, using the one or more sensors by:

sensing signal characteristics of a radio frequency signal received from the selected wireless access point;

analyzing the sensed signal characteristics associated with the selected access point; and determining installation configuration information of the selected wireless access point based on the analyzed signal characteristics; and transmit to the selected wireless access point a message containing the installation configuration information corresponding to the selected wireless access point, wherein said transmitting includes identifying the selected wireless access point using the network identifier and inserting in the message a network command that upon execution causes the selected wireless access point to locally store the installation configuration information in a file maintained in a non-volatile memory of the selected wireless access point for later retrieval; and a wireless access point configured to receive the message containing the installation configuration information from the sensor device, and store the installation configuration information in a file maintained in a non-volatile memory of the selected wireless access point for later retrieval upon executing the network command.

* * * * *